United States Patent [19]

Shirakawa

[11] 4,369,483
[45] Jan. 18, 1983

[54] TRIMMER CAPACITOR

[75] Inventor: Takashi Shirakawa, Morioka, Japan

[73] Assignee: Alps Electric Co., Ltd., Tokyo, Japan

[21] Appl. No.: 172,412

[22] Filed: Jul. 25, 1980

[30] Foreign Application Priority Data

Jul. 25, 1979 [JP] Japan .......................... 54-102601[U]

[51] Int. Cl.³ ............................................. H01G 5/16
[52] U.S. Cl. ...................................... 361/291; 361/290
[58] Field of Search ................................ 361/290, 291

[56] References Cited

U.S. PATENT DOCUMENTS 1,665,616  4/1928  Trump .................................. 361/290
3,943,417  3/1976  Patti ..................................... 361/291

FOREIGN PATENT DOCUMENTS 565575   11/1923  France ................................. 361/290
219361    7/1924  United Kingdom .
411619    6/1934  United Kingdom .
530266   12/1940  United Kingdom .
1459357  12/1976  United Kingdom .
1509063   4/1978  United Kingdom .

Primary Examiner—Elliot A. Goldberg
Attorney, Agent, or Firm—Guy W. Shoup; Gerard F. Dunne

[57] ABSTRACT

A trimmer capacitor includes two spaced electrodes having a dielectric layer therebetween. One of the electrodes includes a resilient central portion formed into a bulbous shape and engaged by a pressing plate threadedly receiving a screw shaft. The screw shaft may be rotated to move the pressing plate axially to vary the distance between the two electrodes.

5 Claims, 1 Drawing Figure

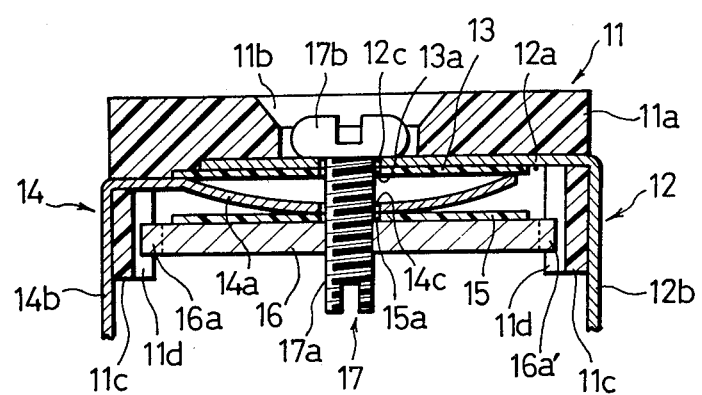

TRIMMER CAPACITOR

BACKGROUND OF THE INVENTION

The present invention relates to trimmer capacitors and, more particularly, to trimmer capacitors of a small size which may have adjustments in the capacitance value thereof changed reliably, and do not change in height when the capacitance value is changed.

Trimmer capactiors of compression type, such as that described in U.S. Pat. No. 3,943,417, typically include an earth electrode secured to an insulating frame, a dielectric member, and another electrode having an end portion attached to an insulating frame and a curved plate portion resiliently displaceable. The plate portion opposes the earth electrode through the dielectric member, and a pressing plate is superposed onto the plate portion. A screw shaft is inserted through the electrodes, the dielectric member and the pressing plate. The rotation of the screw shaft causes the pressing plate to be moved in an axial direction to displace the plate portion and thereby change the distance between the two electrodes. The capacitance value can thereby be varied.

In such conventional trimmer capacitors, there often has been a large amount of play between a threaded opening for the earth electrode and the shaft portion of the screw shaft in order to allow the screw shaft to be rotated smoothly. Therefore, when a screw driver or the like is first engaged with or dis-engaged from the screw shaft, if the axial pressing load by the screw driver changes, the distance between the earth electrode and the curved portion of the other electrode may change to vary the capacitance, even though the screw shaft has not been rotated. Thus, accurate adjustment of the capacitance value is extremely difficult. In addition, the capacitance value may drift a relatively large amount after being set, with obvious disadvantage. Therefore, in order to remove these disadvantages, the threaded opening may be formed in an insulating frame made of a plastic material and have a closed portion tapped by the screw shaft, to thereby lessen play. Such a type of trimmer capacitor is disclosed in U.S. Pat. No. 3,943,417. However, in this kind of trimmer capacitor, a deformation may form in the insulating frame due to the flexibility of the plastic material thereof when the rotating torque of the self-tapping screw shaft is large, such as near the maximum capacitance value of the device. In such case, the distance between the electrodes may be changed by the axial load in trying to rotate the screw shaft, and the capacitance value set may have a large drift, making it further difficult to adjust the capacitance value reliably. In order to prevent such deformation of the insulating frame, the capacitance value may be adjusted in the vicinity where the fastening torque is small. In such case, however, the maximum value of capacitance cannot be made large.

Also, many conventional types of trimmer capacitors move upwards and downwards in accordance with the rotation of the screw shaft, so that the length or height of the trimmer capacitor is disadvantageously changed. Accordingly, such capacitors are not suitable for use in the electric products requiring a thin shape.

Thus, it is an object of the present invention to provide a trimmer capacitor in which the distance between the electrodes may not be changed even by the pressing load of a screw driver and the like.

It is other object of the present invention to provide a trimmer capacitor whose height or length is not changed during adjustment of the capacitance value.

It is still other object of the present invention to provide a thin trimmer capacitor.

Therefore, in accordance with the present invention, the screw shaft is adapted to be constantly supported by an earth electrode surface, and only the pressing plate is designed to be moved upward and downward. Further objects and advantages of the present invention will be more apparent in conjunction with the drawing illustrating one embodiment of the present invention and the explanation thereof.

BRIEF DESCRIPTION OF THE DRAWING

Sole FIGURE is a side sectional view of an embodiment of a trimmer capacitor in accordance with the present invention.

PREFERRED EMBODIMENT OF THE INVENTION

Referring to the FIGURE, reference numeral 11 designates an insulating frame made of a plastic material. In a central portion of a top plate portion 11a of the frame, a opening 11b for rotating a screw shaft 17 described below is disposed. Through the opening 11b, an operating portion 17b of the screw shaft 17 is exposed. Reference numeral 12 designates an earth electrode composed of a sufficiently conductive thin metal plate and includes a disc-like plate portion 12a, a terminal portion 12b and a central opening 12c. A dielectric member 13, such as mica film, is fixed to the underside of the plate portion 12a of the earth electrode 12 and has an opening 13a formed at a center portion thereof. The left end portion of the dielectric member 13 is held to a portion of the frame 11. A second electrode 14 is composed of a sufficiently conductive thin metal plate and includes a plate portion 14a of disc-shape. The plate portion 14a is deformed into an arc configuration in section, and a terminal portion 14b extends from one end of the plate portion 14a. An opening 14c is formed centrally within the plate portion 14a. One end of the second electrode is fixed to the insulating frame 11, whereby the plate portion 14a confronting the plate portion 12a of the earth electrode 12 is supported in a resilient and displaceable manner. The insulating frame 11, the earth electrode 12, the dielectric member 13 and the second electrode 14 are fixed integrally by a plastic mold in a plastic molding machine. A dielectric member 15 has an opening 15a formed at a center portion thereon. A pressing plate 16 of a disc shape made from a sufficiently conductive metal plate having a predetermined thickness has a screw hole formed at a center portion thereof which receives the threaded portions provided on a shaft portion of a screw shaft described hereinbelow. On a circumferential portion of the disc-shaped pressing plate, two protruding portions 16a and 16a' are formed with a spacing of 180° therebetween. These protruding portions 16a and 16a' are engaged with two groove portions 11d and 11d formed in an internal surfaces of cylindrical leg portions 11c of the insulating frame 11. Therefore, the pressing plate 16 can move upward and downward but cannot be rotated in the rotating direction of the screw shaft. A screw shaft 17 made of metal comprises a shaft portion 17a having threads thereon and an operating portion 17b having a groove for receiving a screw driver or like tool. The shaft portion 17a penetrates or passes through the respective openings 12c, 13a, 14c and 15a of the earth electrode 12, the dielectric member 13, the second electrode 14, and dielectric member 15, fits into the screw opening or hole of the pressing plate 16 and protrudes downward from the bottom portion of the pressing plate 16. At the same time, the conductive shaft portion 17a brings the pressing plate 16 and the earth electrode 12 into an electrically conductive relationship.

The plate portion 14a of the second electrode 14 has a resilient force which functions to press the pressing plate 16 downward constantly through the dielectric member 15. When the operating portion 17b exposed through the opening 11 of the insulating frame 11 is rotated by means of a screw driver or the like and the screw shaft 17 is rotated, the pressing plate 16 fitting into the screw shaft moves axially upward and downward in accordance with the rotating direction of the screw shaft 17. Thus, the protruding portions 16a and 16a' disposed on the circumferential portion of the pressing plate 16 are engaged with the groove portions 11d, 11d formed on the internal surface of the cylindrical leg portions 11c of the insulating frame 11, thereby preventing rotation of the pressing plate 16. Since the pressing plate 16 is supported in such a manner that it can move in an axial direction, if the screw shaft 17 supported by the plate portion 12a of the earth electrode 12 is rotated, the pressing plate 16 is guided into the grooves 11d, and moves upward and downward in accordance with the rotating direction of the screw shaft 17. The upward and downward movement of the pressing plate 16 causes the plate portion 14a of the second electrode 14 to be displaced upward through the pressing force and downward by its resiliency because the plate portion 14a can be deformed by resiliency or elasticity. Accordingly, when the screw shaft 17 is rotated, the distance between the plate portion 14a of the second electrode 14 and the plate portion 12a of the earth electrode 12 is changed and the capacitance value of the capacitor can be varied.

According to the above explanation, there are provided grooves 11d, 11d on the internal surface of the cylindrical leg portions of the insulating frame 11 and protruding portions 16a and 16a' on the circumferential portion of the pressing plate 16, respectively, to form a guide preventing rotation. In another way, there may be provided protruding portions on the internal surface of the cylindrical leg portions and grooves on the circumferential portion of the pressing plate 16, or the pressing plate itself 16 may be formed in a non-circular shape and the frame 11 may have a lower spacing portion of a configuration corresponding to that of the pressing plate 16.

What is claimed is:

1. A trimmer capacitor comprising an insulating frame having a top wall surface and a depending side wall surface forming a recess opening downwardly; a flat electrode held securely to the underside of said top wall portion; a thin dielectric member held to the bottom surface of said flat electrode; a second electrode having an edge portion held to said side wall portion and having a plate portion extending resiliently across said recess; a screw shaft extending rotatably through said top wall surface, said flat electrode, said dielectric member and said second electrode and having a head portion held within an opening in the upper surface of said top wall portion; a pressing plate extending across the open lower portion of said recess and having a threaded opening engaging said screw shaft; and coacting guide means formed respectively on said side wall portion and said pressing plate for causing said pressing plate to move axially along said screw shaft during rotation of said head portion thereof to vary the spacing between said flat electrode and said second electrode; said second electrode constantly urging said pressing plate away from said top wall surface to place said screw shaft constantly under axial tension.

2. A trimmer capacitor according to claim 1, said pressing plate substantially closing said recess.

3. A trimmer capacitor according to either claim 1 or 2, said co-acting means including grooves formed in the inner surface of said side wall portion and said pressing plate having protruding portions adapted to engage said grooves.

4. A trimmer capacitor according to claim 1, said pressing plate being formed of metal and said head portion of said screw shaft being held against said flat electrode to connect said pressing plate electrically to said flat electrode.

5. A trimmer capacitor according to claim 4, said pressing plate carrying an insulative film isolating said pressing plate electrically from said second electrode.

* * * * *